No. 672,794. Patented Apr. 23, 1901.
S. MOLTRUP.
COMPRESSION COUPLING FOR SHAFTS.
(Application filed Oct. 29, 1900.)

(No Model.)

WITNESSES
Warren W. Swartz

INVENTOR
Stephen Moltrup
by Bakewell & Bakewell
his Attorneys.

UNITED STATES PATENT OFFICE.

STEPHEN MOLTRUP, OF BEAVERFALLS, PENNSYLVANIA, ASSIGNOR TO STANDARD GAUGE STEEL COMPANY, OF SAME PLACE.

COMPRESSION-COUPLING FOR SHAFTS.

SPECIFICATION forming part of Letters Patent No. 672,794, dated April 23, 1901.

Application filed October 29, 1900. Serial No. 34,701. (No model.)

*To all whom it may concern:*

Be it known that I, STEPHEN MOLTRUP, of Beaverfalls, in the county of Beaver and State of Pennsylvania, have invented a new and useful Improvement in Compression-Couplings for Shafts, of which the following is a full, clear, and exact description, reference being had to the accompanying drawings, forming part of this specification, in which—

Figure 1:
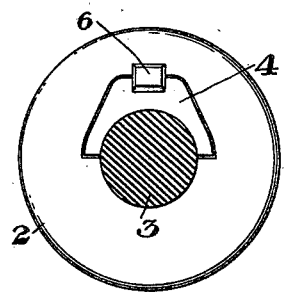
Figure 2:
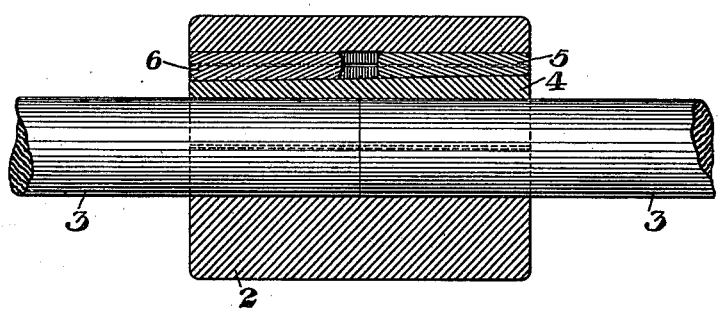
Figure 3:
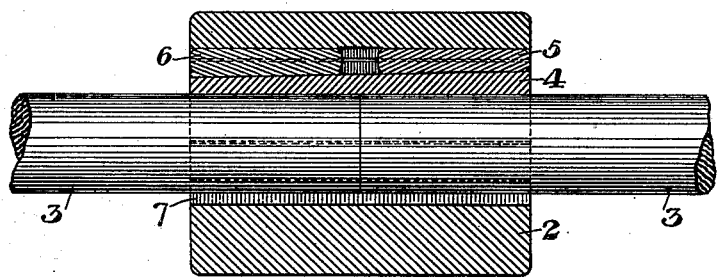

Figure 1 is an end elevation of my improved coupling with the shaft in section. Fig. 2 is a longitudinal section of the coupling in position, and Fig. 3 is a similar view showing a modified form.

My invention relates to compression-couplings for securing together the registering ends of rotatory shafts and is designed to provide a simple and powerful coupling of this character. Heretofore these couplings have consisted of a large number of parts which are expensive and liable to get out of order.

My improved coupling consists, essentially, of two parts with securing-keys and is arranged so that the coupling is easily applied and removed and forms a perfect connection between the shafts.

In the drawings I show the coupling as consisting of a hub or sleeve 2, having a hole therethrough extending axially and of the same size as the shafts 3 3 to be coupled together. The hole or bore through the collar is cut away or enlarged on one side, forming a recess extending the length of the coupling and receiving the bearing-block 4. This bearing-block fits neatly in the recess and has a semicylindrical inner face which fits upon the end portions of the two shafts, and the shafts are secured together within the coupling by two keys 5 and 6, which are driven into a square tapering hole formed by tapering recesses in the bearing-block and the upper face of the recess in the coupling-sleeve to receive the block. The combined length of the two keys is less than the length of the coupling-sleeve in order to leave a space between their inner ends, as shown in Fig. 2. This enables the coupling to be secured to shafts varying slightly in their diameters, since the pressure on each shaft can be changed as necessary by using the plurality of separate keys.

In coupling the two shafts together their ends are brought together within the sleeve, the bearing-block is slipped into place, and the smaller wedge 5 driven into the farther end of the tapering hole. The second key 6 is then driven in from the same end as the first and the wedging action of the two keys securely clamps the ends of the two shafts to the collar.

To remove the coupling, the smaller key 5 is driven backwardly, and as it is loosened it moves easily through the space between the keys, and thus striking the larger key loosens it and enables the coupling to be easily detached.

Instead of securing the coupling-sleeve to the shafts by friction alone I may provide a lower slot in the sleeve, as shown in Fig. 3, in which a straight feather 7 is inserted, this feather entering grooves or recesses in the two shafts in the usual manner.

The advantages of my invention result from the simplicity of the coupling and the ease with which it is applied and removed. The two keys with the space between them are especially desirable, as they enable the coupling to be easily and quickly detached.

Many variations may be made in the form and arrangement of the parts without departing from my invention.

I claim—

1. In a shaft-coupling, a sleeve having a separate longitudinal bearing-block therein, there being a continuous hole extending between the sleeve and bearing-block, said hole being smaller at one end of the block than at the other end, and a plurality of keys arranged to be driven in through the same end of the sleeve and seat in different parts of the hole; substantially as described.

2. In a shaft-coupling, a sleeve having a cylindrical hole therethrough, which is cut away at one side, a bearing-block extending longitudinally of the sleeve in the cut-away portion, there being a tapering hole extending from end to end of the sleeve between it and the bearing-block, and a plurality of keys of different sizes seated in said hole, with a space between their adjacent ends; substantially as described.

3. In a shaft-coupling, a sleeve having a separate longitudinal bearing-block therein, there being a tapering hole extending from end to end of the sleeve between it and the bearing-block, a plurality of keys of different sizes arranged to be driven in from the same end of the sleeve, and seat in different parts of the hole, and a key connection between the bearing-block and the shafts; substantially as described.

In testimony whereof I have hereunto set my hand.

STEPHEN MOLTRUP.

Witnesses:
C. P. BYRNES,
G. I. HOLDSHIP.